(12) United States Patent  
Saward et al.

(10) Patent No.: US 7,431,485 B1  
(45) Date of Patent: Oct. 7, 2008

(54) VEHICLE LIGHT BAR ASSEMBLY

(75) Inventors: Ronald G. Saward, Shelby Township, MI (US); William R. Henderson, New Baltimore, MI (US); John H. Harberts, Macomb, MI (US)

(73) Assignee: SportRack LLC, Sterling Heights, MI (US)

( * ) Notice: Subject to any disclaimer, the term of this patent is extended or adjusted under 35 U.S.C. 154(b) by 295 days.

(21) Appl. No.: 11/101,982

(22) Filed: Apr. 8, 2005

(51) Int. Cl.  
*B60Q 1/26* (2006.01)

(52) U.S. Cl. .................. 362/493; 362/240; 362/496; 362/501; 362/503; 362/504; 362/505; 362/506; 362/540; 362/542; 362/543; 362/544

(58) Field of Classification Search .......... 362/240, 362/493, 496, 501, 503–506, 540, 542–544  
See application file for complete search history.

(56) References Cited

U.S. PATENT DOCUMENTS

| | | | | |
|---|---|---|---|---|
| 5,150,959 A | * | 9/1992 | Paffrath et al. | 362/548 |
| 5,988,839 A | * | 11/1999 | Pokorney et al. | 362/493 |
| 2004/0109313 A1 | * | 6/2004 | Smith | 362/240 |

* cited by examiner

*Primary Examiner*—Stephen F Husar  
*Assistant Examiner*—Meghan K. Dunwiddie  
(74) *Attorney, Agent, or Firm*—Rader, Fishman & Grauer PLLC

(57) ABSTRACT

A lighting assembly for a vehicle includes an elongated base plate having an inner surface and an outer surface. The base plate includes at least one opening. The lighting assembly further includes at least one light source adapted to be mounted to the base plate at the opening. The base plate is configured to be mounted and to conform aerodynamically to an exterior surface of the vehicle.

28 Claims, 6 Drawing Sheets

VEHICLE LIGHT BAR ASSEMBLY

FIELD OF THE INVENTION

The present invention relates generally to exterior lighting systems for vehicles, and more particularly, to a light bar assembly for mounting a lamp or lamps on a vehicle.

BACKGROUND OF THE INVENTION

Exterior lighting systems for vehicles are well known to the public and in the industry as being used for safety and for increasing the overall aesthetic appeal of a vehicle. An exterior lighting system of a vehicle may include headlamps, rear lights, brake lamps, reverse lights, turn signals, and the like. These lighting systems are generally required for safety purposes and are employed to signal other drivers of one's intentions and to provide visibility in areas and at times when there is not adequate natural light to see safely.

Additional exterior lighting systems, such as markers, spotlights, and floodlights, may be added to the vehicle for a variety of reasons, including enhancing the safety of the vehicle and its occupants, improving the overall appearance and appeal of the vehicle, facilitating sporting uses such as off-road driving, or to provide a portable light source to illuminate fixed objects exterior to the vehicle. Many of these exterior lighting systems are mounted on the roof of a vehicle and require that multiple large holes be punched into the roof for both assembly purposes and for providing means to access the electrical wiring harness of the vehicle.

The size of the assembly holes is dictated by the size of the lighting system being added to the vehicle and its impact on the aerodynamics of the vehicle. A lighting system that greatly increases the frontal surface of a vehicle will negatively impact the aerodynamics of the vehicle which in turn negatively impacts fuel economy and increases wind noise. Also, fasteners for securing the lighting assembly to the vehicle must be properly sized to account for the wind resistance of the lighting assembly. The larger the fasteners required to secure the lighting system, the larger the holes required in the sheet metal of the vehicle. Large holes in the sheet metal decrease its effectiveness as a sound deadener, thus increasing the level of outside noise that enters the cabin of the vehicle. Such holes also provide potential avenues for contaminants or water, which can result in inconveniences or undesirable damage to the vehicle.

These exterior lighting accessories are often added to vehicles after the vehicles have been assembled and sent to dealerships or sold to customers. Typically, one or more of the interior components of the vehicle, such as the headliner, interior door coverings, pillar coverings, or carpeting, may be disturbed when installing conventional or previously known exterior lighting and the required wiring.

One alternative to mounting a lighting system to the roof of a vehicle may be to mount a lighting system to an aftermarket frame that has been secured to the vehicle. While these added frames minimize the issues of adding holes to sheet metal and disturbing the interior of the vehicle, typically these frames are made of metallic components and add considerable weight to the vehicle, resulting in loss of fuel economy. Along with adding weight to the vehicle, these "stand-off" type frames and lighting systems typically extend several inches above the roof line of the vehicle, thus increasing air resistance as the vehicle is in motion, which in turn increases wind noise and leads to an even further loss of fuel economy. Also, these aftermarket frames are generally added only to vehicles such as pickup trucks that can support the weight of the frame and are not encumbered by a roof that extends the entire length of the vehicle.

Therefore, a need exists for a vehicle light bar assembly that can be adapted for use on a wide variety of vehicles and mounted to the exterior surface of the vehicle such that the impact to the aerodynamic air flow of the vehicle is minimized. Also, the vehicle light bar assembly may be secured to the exterior surface without disturbing the interior components of the vehicle and unduly stressing the exterior sheet metal of the vehicle. The vehicle light bar should seal the potential leak paths for contaminants and water into the vehicle as well.

SUMMARY OF THE INVENTION

A lighting assembly for a vehicle is provided that may be secured to an exterior surface of the vehicle and configured to conform to the aerodynamic lines of the vehicle without disturbing the interior of the vehicle. The lighting assembly includes an elongated base plate having an inner and an outer surface. The base plate includes at least one opening. At least one light source is adapted to be mounted to the base plate at the opening. The base plate is also configured to be mounted and to conform to an exterior surface of the vehicle.

A method for securing the lighting assembly to a vehicle is also provided. The method includes the steps of forming holes in the exterior surface of the vehicle that correspond to a plurality of holes in the base plate. Fasteners are inserted into the formed holes. The fasteners are configured to accept mating fasteners and the lighting assembly is positioned so that the holes in the lighting assembly are aligned with the holes formed in the exterior surface of the vehicle. The lighting assembly is secured to the exterior surface by inserting and attaching the mating fasteners to the fasteners in the formed holes, all in a manner such that the lighting assembly conforms aerodynamically to the exterior surface of the vehicle.

BRIEF DESCRIPTION OF THE DRAWINGS

The features and inventive aspects of the present invention will become more apparent from the following detailed description, claims, and drawings, of which the following is a brief description:

DETAILED DESCRIPTION

Figure 1:
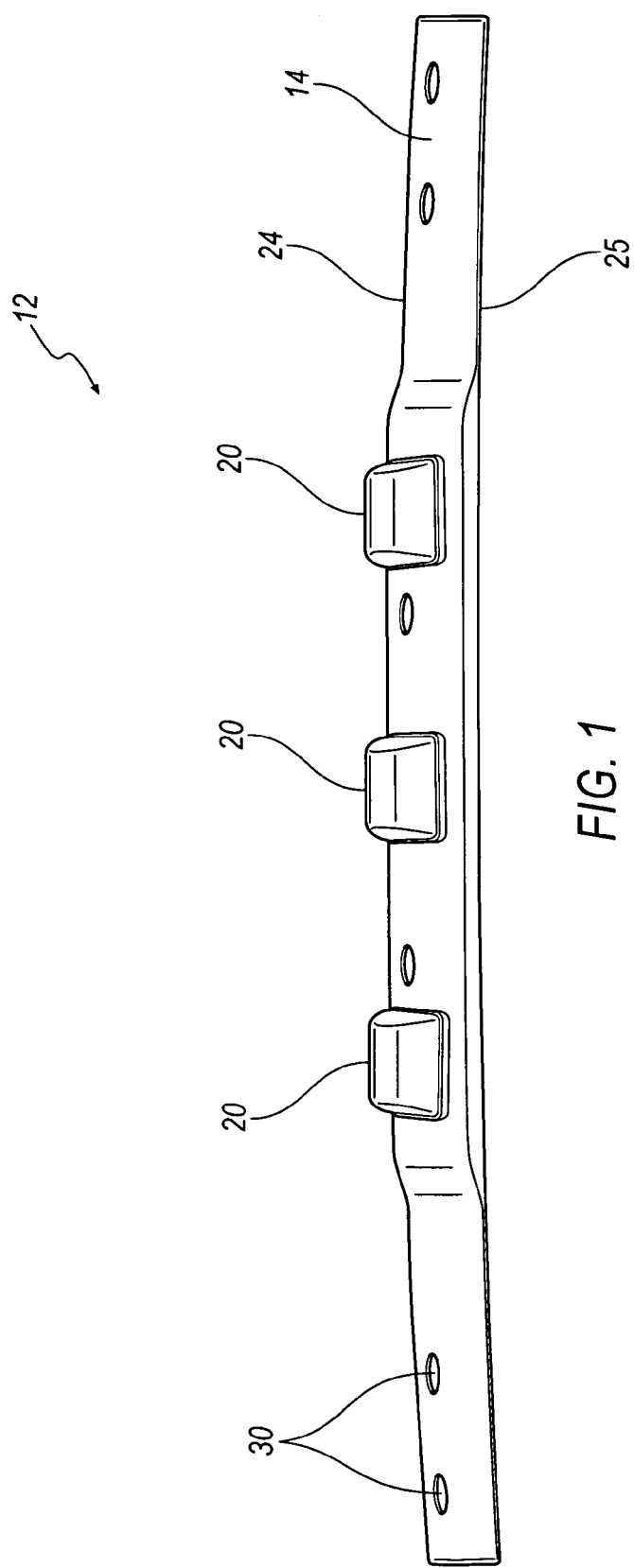
FIG. 1 is a perspective view of the light bar assembly according to an embodiment of the present invention.

Referring now to the drawings, preferred illustrative embodiments of the present invention are shown in detail. Although the drawings represent embodiments of the present invention, the drawings are not necessarily to scale and certain features may be exaggerated to better illustrate and explain the present invention. Further, the embodiments set forth herein are not intended to be exhaustive or otherwise to limit or restrict the invention to the precise forms and configurations shown in the drawings and disclosed in the following detailed description.

Referring to FIGS. 1-6, a vehicle 10 is shown with a light bar assembly 12 mounted to a roof 13 of the vehicle. In the embodiment, illustrated in FIG. 2, light bar assembly 12 is configured to function as a marker light system. In another embodiment illustrated in FIG. 3, light bar assembly 12 is configured to function as a spotlight system. It is important to note, however, that any type of lamp or lighting configuration may be utilized with light bar assembly 12 and is not limited to those configurations described herein, and that light bar assembly 12 may be mounted to any suitable exterior surface of any vehicle.

Figure 5:
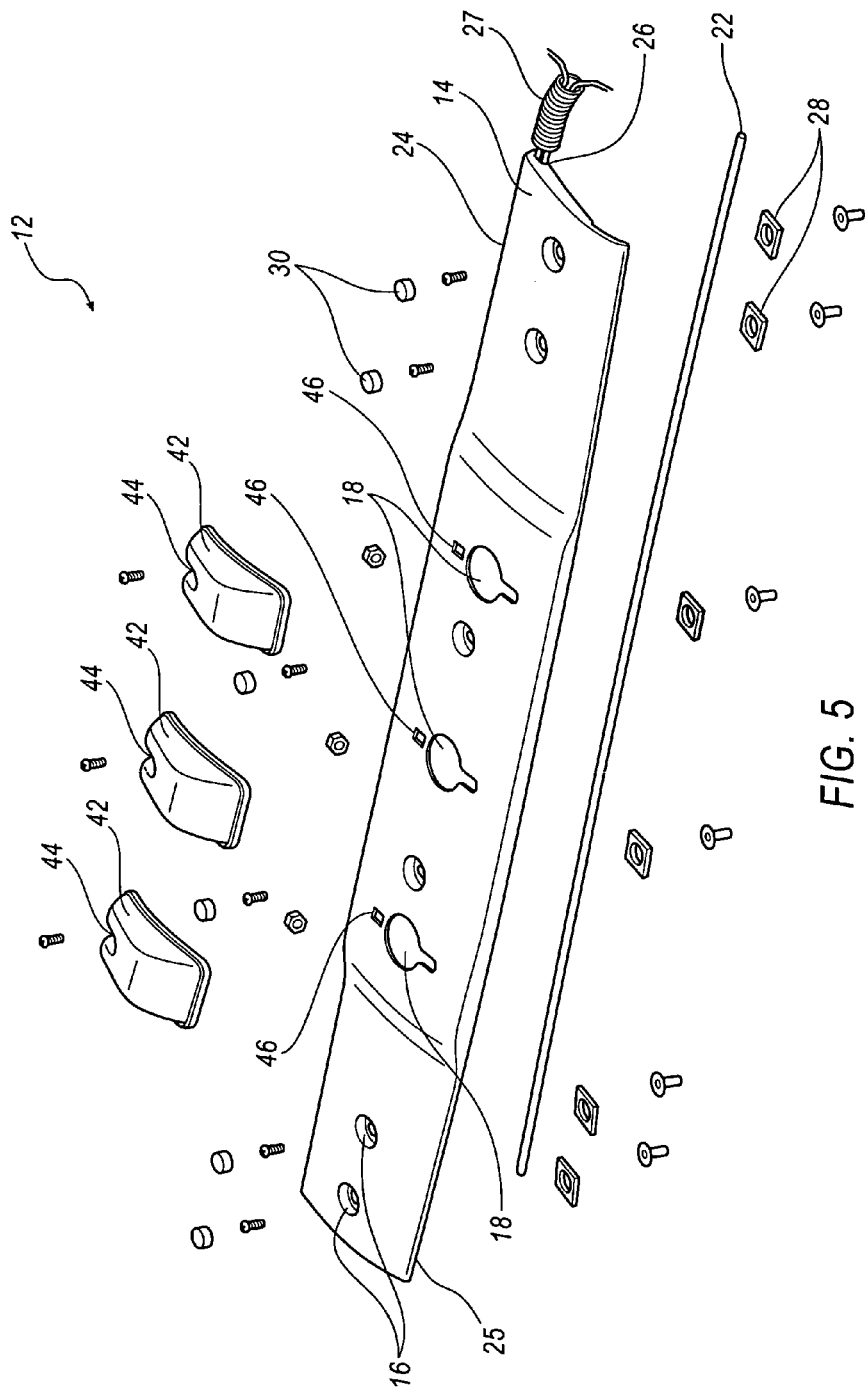
FIG. 5 is an exploded view of the light bar assembly of FIG. 2.
Figure 6:
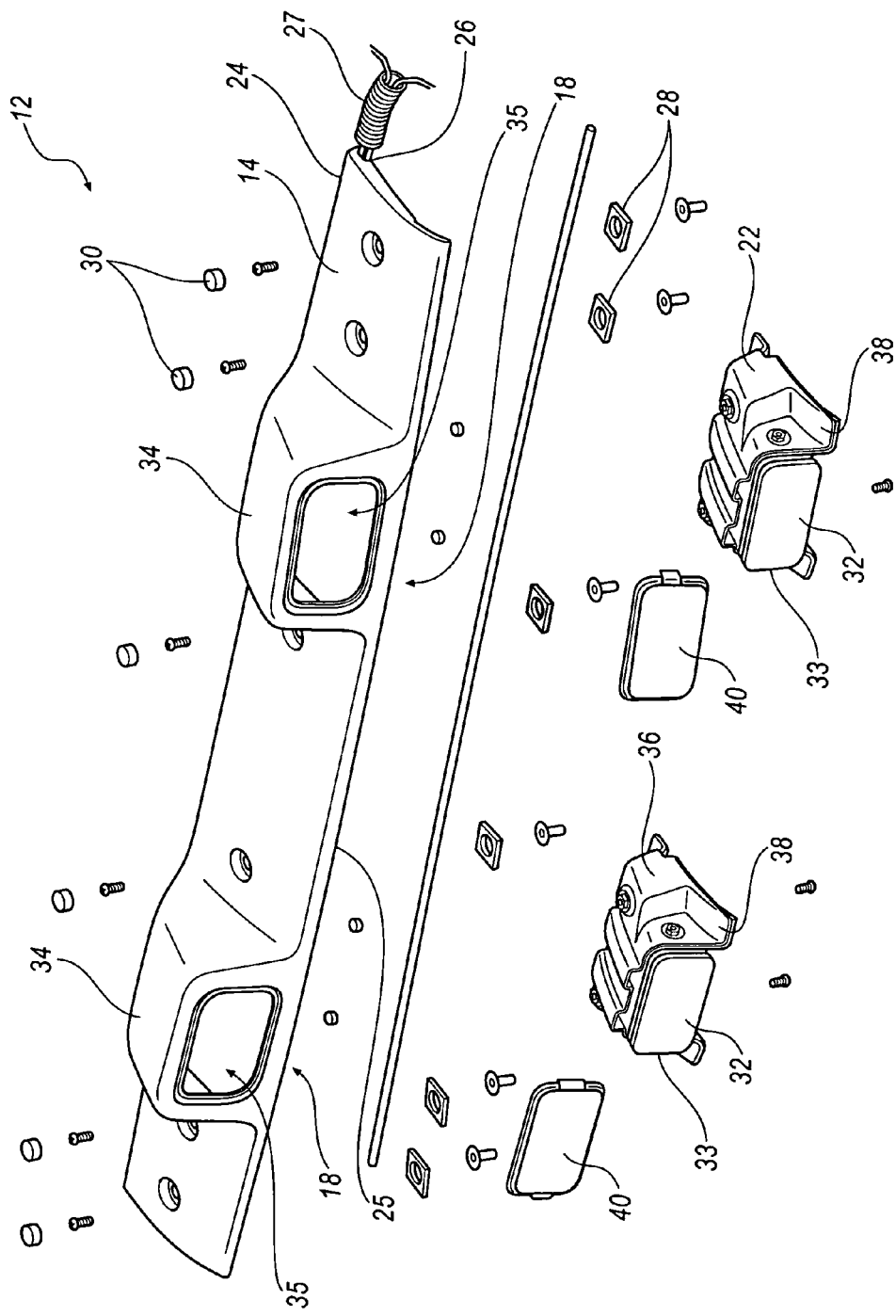
FIG. 6 is an exploded view of the light bar assembly of FIG. 3.

Regardless of the light system employed, light bar assembly 12 maintains the same basic components, whether the lamps are spotlights, markers, or the like. Therefore, a generic light bar assembly will be described and the differences identified below as specific light systems are discussed. FIG. 1 illustrates light bar assembly 12 according to an embodiment. Light bar assembly 12 includes a base plate 14 designed to conform aerodynamically to any exterior surface of the vehicle. As illustrated by FIGS. 5 and 6 base plate 14 includes a plurality of holes 16 adapted to accept fasteners so that light bar assembly 12 may be mounted by base plate 14 to the vehicle. Base plate 14 further includes a plurality of openings 18 sized to accept lamps or light sources 20, such as spotlights, markers, and the like. The lamps employed in both marker light systems and spotlight systems have reflective and refractive surfaces for projecting light away from the actual light source, typically towards an object. The openings shown in FIG. 5 are intended for light sources that may be attached to a top surface of base plate 14. As shown in FIG. 6, the base plate may include domes in the top surface, positioned at openings 18, that allow the light sources to be assembled to base plate from the bottom. Regardless of the configuration employed, openings 18 are required to assemble light sources 20 to base plate 14.

A gasket 22, typically made of rubber, silicon, or other suitable sealing material, is preferably provided to seal a rear edge 24 of base plate 14 to the vehicle to aid in preventing water intrusion at the rear of base plate 14 that may corrode the electric system of light bar assembly 12 or enter the passenger compartment at locations where light bar assembly is secured to vehicle 10. Located nearby, and extending the length of rear edge 24, is a trough 26 for housing a wiring bundle 27. The wiring bundle runs from the vehicle power supply (not shown) to each of light sources 20 through trough 26. Trough 26 directs wiring to each individual light source 20 during assembly of light bar assembly 12 to the vehicle while at the same time protecting the wiring from the outside elements and ensuring that the wiring remains in place under the base plate 14 while the vehicle is in motion.

Trough 26 is open at either end of base plate 14 to allow wiring bundle 27 to enter base plate 14 from the side so that no large access holes are required in the surface of the vehicle where light bar assembly 12 is being mounted, in this particular embodiment, the exterior surface of the roof. Wiring may be fed through a hole in one or more pillars of the vehicle and from there into trough 26. A cover (not shown) will be attached to the pillars to hide the wire routing and provide the look of a continuous plate from the driver-side pillar across the roof and down the passenger-side pillar. The pillars of the vehicle are better suited for the access holes required for the wiring bundle than the roof of the vehicle because the pillars are typically fabricated of thicker metal than the thin sheet metal of the roof. An access hole formed in the pillar will have less of an impact on the noise, vibration, and harshness dynamics of the vehicle than an access hole punched in the roof. Also, the pillars typically house vehicle wiring because of the natural trough they form.

Figure 2:
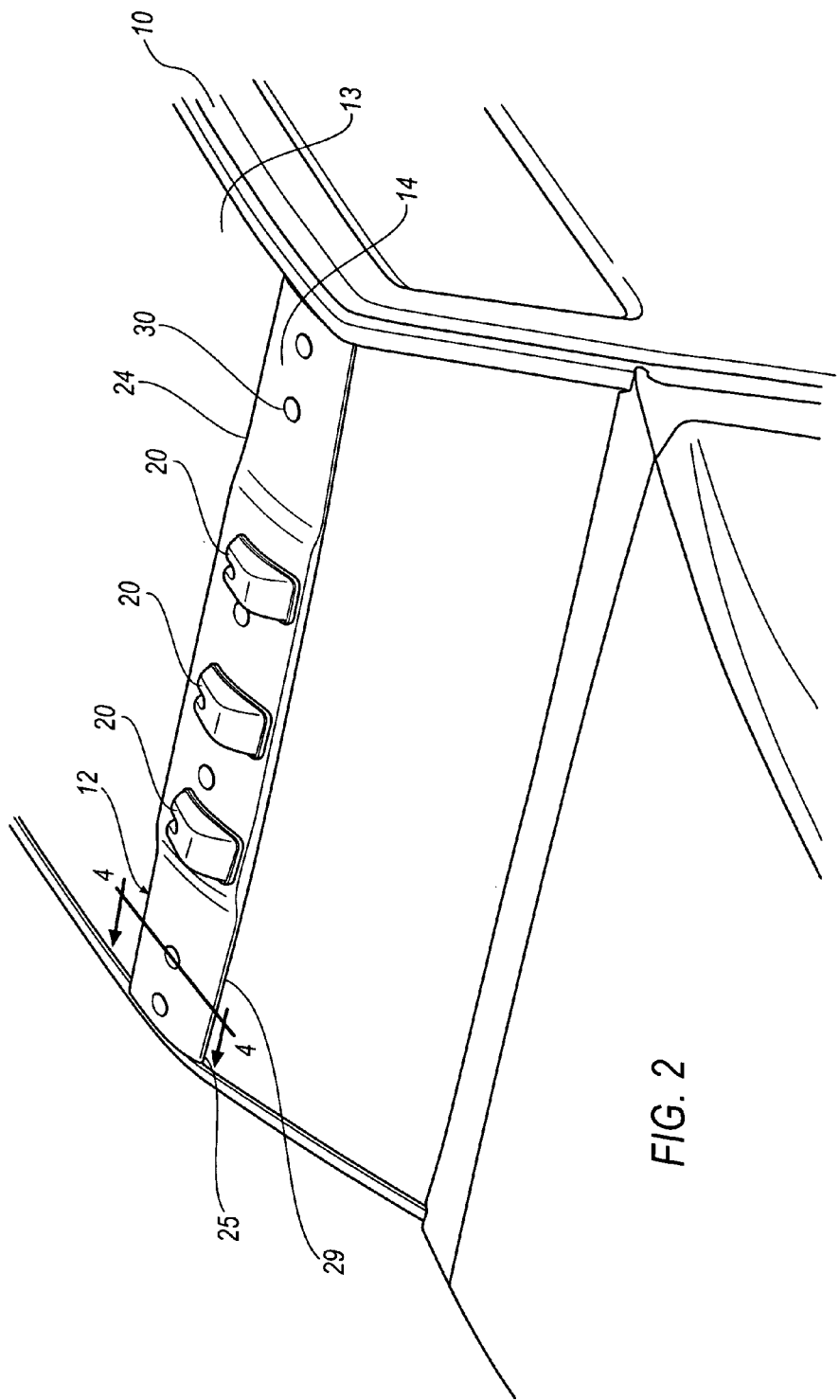
FIG. 2 is a perspective view of a light bar assembly according to the embodiment illustrated in FIG. 1, being shown as mounted on the roof of a vehicle.
Figure 3:
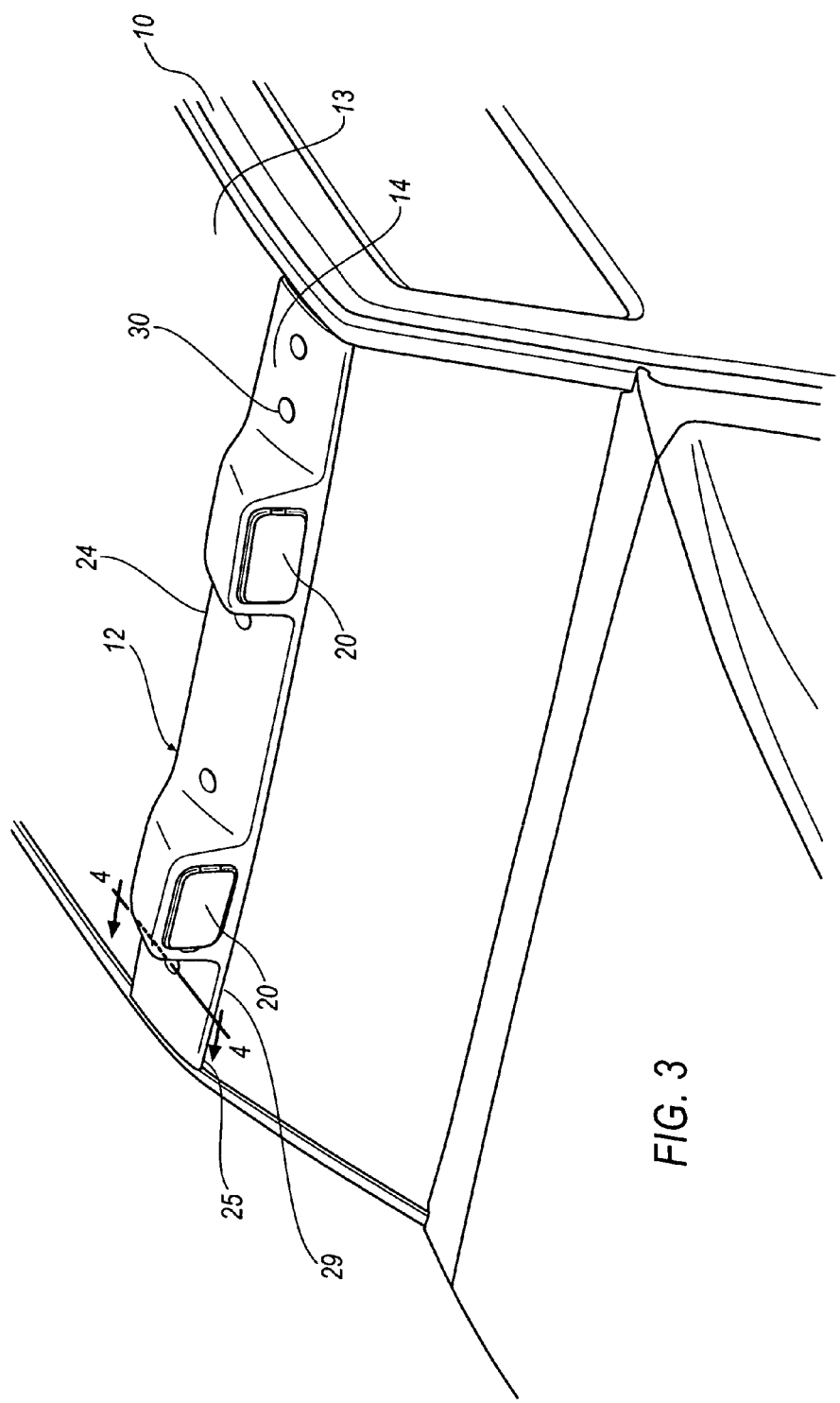
FIG. 3 is a perspective view of a light bar assembly according to another embodiment, being shown as mounted on the roof of a vehicle.

As illustrated by each of the embodiments in FIGS. 2 and 3, a front edge 25 of base plate 14 may be adapted to be sealed against a windshield reveal 29 of vehicle 10 to provide an aerodynamic transition between vehicle 10 and light bar assembly 12 to minimize the increase in air resistance of vehicle 10. The sealing against windshield reveal 29 will also act to prevent water and contaminant intrusion at the front of light bar assembly 12. Both front edge 25 and rear edge 24 may be adapted to seal against any exterior surface of vehicle 10 to prevent both water and contaminant intrusion and the negative impacts to the aerodynamics of the vehicle.

Figure 4:
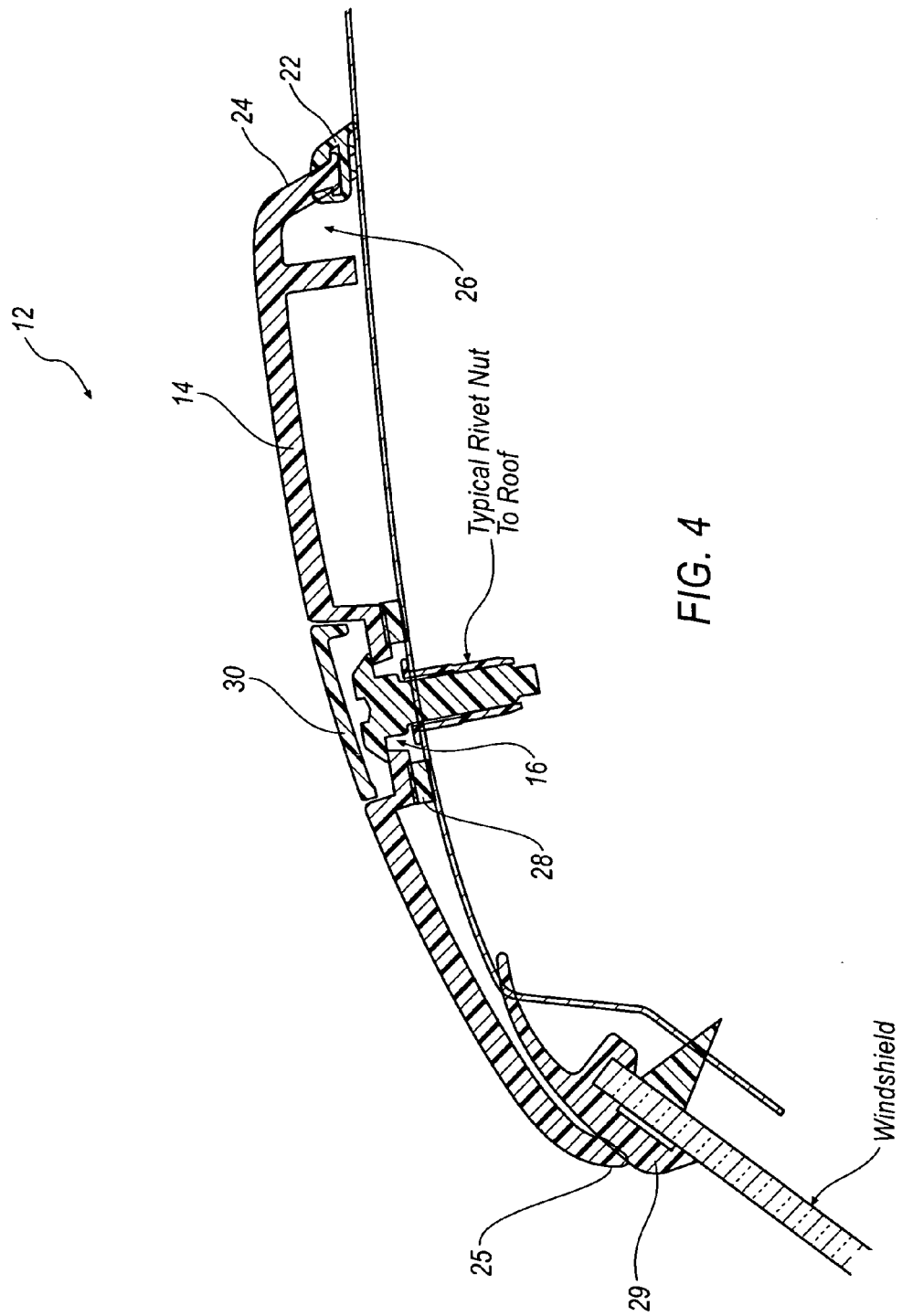
FIG. 4 is a cross-sectional view of the light bar assembly of FIGS. 2 and 3 taken along line 4-4.

Both of the embodiments illustrated in FIGS. 2 and 3 employ a similar base plate 14 design. FIG. 4. illustrates a cross-sectional view of light bar assembly 12 taken from front edge 25 to rear edge 24 through hole 16 of base plate 14. Front edge 25 seals against windshield reveal 29 forming a fluid transition between the windshield and base plate 14. The remainder of the cross section conforms to the exterior surface of the vehicle leading to rear edge 24. Except for the positioning of lamps on base plate 14, much of the base plate conforms to the exterior surface of vehicle 10, thereby minimizing the impact to the aerodynamics of the vehicle. The minimal impact to the aerodynamics of the vehicle, in turn, results in a minimal impact to fuel economy and the wind noise entering the passenger compartment.

Light bar 12 may be mounted to the roof of the vehicle through the use of bolts, screws, or like fasteners and rivet nuts or weld nuts. An advantage of the present invention over prior art light bar assemblies is that the use of rivet nuts allows light bar assembly 12 to be aerodynamically mounted to the exterior surface of the vehicle without having to disturb the interior headliner. Holes may be either stamped or drilled into the vehicle sheet metal and rivet nuts may be inserted into the holes and secured in the same manner as a typical rivet would be secured. Alternatively, during production of the vehicle, weld nuts may be attached to the underside of the sheet metal at the stamped or drilled holes prior to assembly of the interior. The aerodynamic aspects of light bar assembly 12 allow for the use of rivet nuts or weld nuts that are of minimal size. Because of the shape of light bar assembly 12, the wind flow will not act to force light bar assembly 12 to separate away from the vehicle as the vehicle is in motion. The wind will be directed up the windshield and across the top surface of light bar assembly 12 resulting in less upward force on light bar assembly 12 and its fasteners versus other prior art lighting systems. The rivet nuts or weld nuts as well as the mating fasteners used to secure base plate 14 to vehicle 10 may be designed to withstand the minimal wind forces affecting base plate 14. Smaller sized fasteners and a smaller number of fasteners may be used resulting in even smaller, and a lower number of holes being formed in the roof of the vehicle, thus ensuring a minimal impact to the wind noise that may enter the passenger compartment through holes 16.

The holes 16 in light bar assembly 12 may then be located over the rivet nuts or the weld nuts and fasteners may be introduced into holes 16 to secure base plate 14 to the exterior surface of the vehicle. Foam pads 28 formed with holes are positioned between base plate 14 and the exterior surface. The holes in foam pads 28 are located over holes 16 and are held in place by the fasteners used to secure base plate 14 to the exterior surface. The foam pads are provided to dampen the vibration between the base plate and the exterior surface of the vehicle and to prevent any water or contaminants from entering the passenger compartment. Covers 30 may be added to holes 16 to hide the unsightly top of the fasteners after they have been seated in the rivet nuts or weld nuts and have secured base plate 14 to the vehicle.

FIG. 5 illustrates light bar assembly 12 according to the embodiment illustrated in FIG. 2. In this particular embodiment, marker lights 42 are adapted to be assembled to base plate 14 at openings 18. In this particular embodiment, three marker lights are employed. Marker lights are typically orange in color and are used to alert other drivers and pedestrians of oncoming traffic. Marker lights 42 may include a snap or slide feature that allows the marker lights to be positioned in openings 18. A hole 44 is also provided in marker lights 42 to accept a fastener to be used in securing marker lights 42 to base plate 14. An aperture 46 is provided between opening 18 and rear edge 24 of base plate 14 and is sized to accept a push-in fastener, such as a push nut or the like. As marker light 42 is installed in opening 18, hole 44 is aligned with the push-in fastener seated in aperture 46. The fastener may then be inserted in hole 44 and into the mating fastener of aperture 46 to secure marker light 42 to base plate 14. Each subsequent marker light 42 may be secured to base plate 14 in this manner. Wiring is attached to marker lights 42 as described above prior to assembly of base plate 14 to the exterior surface of the vehicle.

FIG. 6 illustrates light bar assembly 12 according to the embodiment illustrated in FIG. 3. In this particular embodiment, spotlights 32 are adapted to be assembled to light bar assembly 12. Spotlights are employed in dimly lit areas when head lamps alone are insufficient to light the roadway or trail. Spotlights, mounted on the roof of the vehicle as illustrated in FIG. 3, aid the driver and passenger by projecting light further in front of the vehicle and may also be of a higher intensity than regular lamps, thereby aiding the driver as the driver negotiates a dimly lit roadway or other terrain.

Base plate 14 may include a plurality of domes 34 to house the spotlights. In this particular embodiment, base plate 14 includes two domes 34 positioned at openings 18. Each dome 34 extends outwardly from base plate 14 at its respective opening 18 to create a cavity sized to house a spotlight assembly 36. Domes 34 and base plate 14 are a single continuous piece with curved transitions therebetween to limit the impact to the aerodynamics of the vehicle. Dome 34 also includes an aperture 35 sized to accommodate an outer edge 33 of spotlight 32. Spotlight assembly 36 includes a support 38, spotlight 32 or other like lamp, multiple fasteners, and foam padding.

Support 38 is sized to receive and position spotlight 32. Fasteners are used to secure spotlight 32 to support 38 and are inserted in a horizontal direction from support 38 to spotlight 32. Spotlight 32 is secured to support 38 in a manner that allows a user to rotate spotlight 32 up and down a number of degrees and position it based on the user's preference. After assembly of spotlight 32 to support 38 and prior to assembly of base plate 14 to the roof of the vehicle, spotlight assembly 36 is assembled to base plate 14. Spotlight assembly 36 is placed in dome 34 through opening 18 on the underside of base plate 14. Spotlight 32 is positioned in aperture 35 at outer edge 33 so that the lamp portion of the spotlight is visible. Fasteners are inserted vertically through support 38 and into dome 34 to secure spotlight assembly 36 to base plate 14. The same operations are duplicated to attach the second spotlight assembly to base plate. Wiring is attached to spotlights 32 as described above prior to assembly of base plate 14 to the exterior surface of the vehicle. A cover 40 may be secured to base plate 14 at aperture 35 to conceal spotlights when they are not in use.

The described embodiments offer means to secure light sources to the exterior surfaces of vehicles without having to disturb the interior of the vehicles and in a manner that minimizes the negative impact to the aerodynamics of the vehicle. The enhanced safety features of the light bar assembly and the minimal impact to the aerodynamics of the vehicle, which impacts fuel economy and the noise, vibration, and harshness dynamics of the vehicle, make the light bar assembly an appealing addition to any vehicle.

The present invention has been particularly shown and described with reference to the foregoing embodiments, which are merely illustrative of the best modes for carrying out the invention. It should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

What is claimed is:

1. A lighting assembly for a vehicle comprising:
    an elongated base plate having an inner surface and an outer surface, said base plate including at least one opening; and
    at least one light source selectively mounted to said base plate at said at least one opening;
    wherein said base plate is configured to be mounted and to conform aerodynamically to an exterior surface of the vehicle; and
    wherein said base plate includes a front edge extending substantially the length of said base plate, said front edge being configured to conform to and seal against the exterior surface of the vehicle.

2. The light assembly as recited in claim 1, wherein said front edge conforms to and seals against a windshield reveal of the vehicle.

3. The lighting assembly as recited in claim 1, wherein said at least one opening is sized to accept said at least one light source.

4. The lighting assembly as recited in claim 1, wherein said lighting system further includes electrical wiring adapted to be connected between said at least one light source and a power source for energizing said light source.

5. The lighting assembly as recited in claim 1, wherein said at least one light source includes reflective and refractive surfaces.

6. The lighting assembly as recited in claim 1, wherein said base plate includes a rear edge extending the length of said base plate, said rear edge being configured to form a trough on said inner surface.

7. The lighting assembly as recited in claim 1, wherein said front edge extends the length of said base plate.

8. A lighting assembly for a vehicle comprising:
    an elongated base plate having an inner surface and an outer surface, said base plate including at least one opening; and
    at least one light source selectively mounted to said base plate at said at least one opening;
    wherein said base plate is configured to be mounted and to conform aerodynamically to an exterior surface of the vehicle and wherein said base plate includes a plurality of holes for accepting fasteners to secure said base plate to the vehicle;

wherein said lighting assembly further includes covers to mask heads of the fasteners.

9. A lighting assembly for a vehicle comprising:

an elongated base plate having an inner surface and an outer surface, said base plate including at least one opening; and at least one light source selectively mounted to said base plate at said at least one opening;

wherein said base plate is configured to be mounted and to conform aerodynamically to an exterior surface of the vehicle wherein said base plate further includes at least one domed surface extending outwardly from said outer surface, said at least one domed surface including an aperture sized to accept said at least one light source, and said at least one domed surface being positioned at said at least one opening.

10. The lighting assembly as recited in claim 9, wherein said at least one light source includes a support sized to be inserted through said at least one opening and seated in said at least one domed surface.

11. The lighting assembly as recited in claim 10, wherein said support is sized to accept said at least one light source.

12. The lighting assembly as recited in claim 9, wherein said lighting assembly further includes a cover sized to conceal said aperture.

13. A lighting assembly for a vehicle comprising:

an elongated base plate having an inner surface and an outer surface, said base plate including at least one opening; and at least one light source selectively mounted to said base plate at said at least one opening;

wherein said base plate is configured to be mounted and to conform aerodynamically to an exterior surface of the vehicle wherein said base plate includes a rear edge extending the length of said base plate, said rear edge being configured to form a trough on said inner surface; and wherein said lighting assembly further includes a gasket configured to be fitted to said base plate at said rear edge.

14. A lighting assembly for a vehicle comprising:

an elongated base plate having an inner surface and an outer surface, said base plate including at least one opening; and at least one light source selectively mounted to said base plate at said at least one opening;

wherein said base plate is configured to be mounted and to conform aerodynamically to an exterior surface of the vehicle and wherein said base plate includes a plurality of holes for accepting fasteners to secure said base plate to the vehicle; and wherein said lighting assembly also includes a plurality of foam pads for sealing said base plate to the exterior surface of the vehicle at said plurality of holes.

15. A light bar assembly for a vehicle comprising:

an elongated base plate having an inner surface and an outer surface, said base plate including a rear edge configured to form a trough along the length of said base plate on said inner surface, said base plate further including a front edge configured to conform to a windshield reveal of the vehicle, said base plate further including at least one opening, and said base plate also including a plurality of holes; and at least one light source selectively mounted to said base plate at said at least one opening;

wherein said base plate is configured to be mounted and to conform aerodynamically to an exterior surface of the vehicle and said plurality of holes are adapted to accept fasteners to secure said light bar assembly to the exterior surface of the vehicle.

16. The light bar assembly as recited in claim 15, wherein said light bar assembly further includes covers to mask heads of the fasteners.

17. The light bar assembly as recited in claim 15, wherein said base plate includes at least one domed surface extending outwardly from said outer surface, said at least one domed surface including an aperture sized to accept said at least one light source, and said at least one domed surface being positioned at said at least one opening.

18. The light bar assembly as recited in claim 17, wherein said at least one light source includes a support sized to be inserted through said at least one opening and seated in said at least one domed surface.

19. The light bar assembly as recited in claim 18, wherein said support is sized to accept said at least one light source.

20. The light bar assembly as recited in claim 17, wherein said light bar assembly further includes a cover sized to conceal said aperture.

21. The light bar assembly as recited in claim 15, wherein said at least one opening is sized to accept said at least one light source.

22. The light bar assembly as recited in claim 15, wherein said at least one light source includes reflective and refractive surfaces.

23. The light bar assembly as recited in claim 15, wherein said light bar assembly further includes a gasket configured to be fitted to said base plate at said rear edge.

24. The light bar assembly as recited in claim 15, wherein said light bar assembly further includes foam pads for sealing said base plate to the exterior surface of the vehicle at said plurality of holes.

25. The light bar assembly as recited in claim 15, wherein said light bar assembly further includes electrical wiring adapted to be connected between said at least one light source and a power source for energizing said at least one light source.

26. A method for aerodynamically securing a lighting assembly to a vehicle, comprising the steps of:

forming a plurality of holes in an exterior surface of the vehicle that correspond to a plurality of holes in the lighting assembly;

inserting fasteners in said formed holes, the fasteners being configured to accept mating fasteners;

positioning the lighting assembly such that the plurality of holes in the lighting assembly are aligned with the formed holes in the exterior surface of the vehicle; and securing the lighting assembly to the exterior surface of the vehicle by inserting and attaching the mating fasteners to the fasteners in the formed holes such that the lighting assembly is aerodynamically mounted to the exterior surface of the vehicle.

27. The method according to claim 26, further comprising the step of forming a hole in a pillar of the vehicle for the routing of the wiring to the lighting assembly.

28. The method according to claim 26, further comprising the steps of connecting a plurality of light sources included in the lighting assembly to the electrical wiring and power supply of the vehicle.

* * * * *